(12) United States Patent
Spracklen et al.

(10) Patent No.: US 7,434,004 B1
(45) Date of Patent: Oct. 7, 2008

(54) PREFETCH PREDICTION

(75) Inventors: Lawrence A. Spracklen, Boulder Creek, CA (US); Santosh G. Abraham, Pleasanton, CA (US); Stevan Vlaovic, Cupertino, CA (US); Darryl J. Gove, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 418 days.

(21) Appl. No.: 10/870,010

(22) Filed: Jun. 17, 2004

(51) Int. Cl.
*G06F 12/00* (2006.01)

(52) U.S. Cl. .................. 711/137; 711/204; 711/213; 712/226; 717/157

(58) Field of Classification Search ................ None
See application file for complete search history.

(56) References Cited

U.S. PATENT DOCUMENTS

| | | | | |
|---|---|---|---|---|
| 6,560,693 | B1* | 5/2003 | Puzak et al. | 712/207 |
| 6,799,263 | B1* | 9/2004 | Morris et al. | 712/207 |
| 7,089,399 | B2* | 8/2006 | Tetrick | 711/213 |
| 2004/0128489 | A1* | 7/2004 | Wang et al. | 712/235 |
| 2004/0154011 | A1* | 8/2004 | Wang et al. | 717/158 |
| 2005/0027941 | A1* | 2/2005 | Wang et al. | 711/121 |
| 2005/0149697 | A1* | 7/2005 | Enright et al. | 712/214 |

OTHER PUBLICATIONS

Michel Dubois et al., "Assisted Execution," CENG Technical Report 98-25, Oct. 1998, pp. 1-25.

Jonas Skeppstedt et al., "Hybrid Compiler/Hardware Prefetching for Multiprocessors Using Low-Overhead Cache Miss Trapps," 8 pages, (pp. 298-305 ICPP 1997, Intl. Conference on Parallel Processing), Aug. 11-15, 1997.

Mark Horowitz et al., "Informing Memory Operations: Memory Performance Feedback Mechanisms and Their Applications," ACM Transactions on Computer Systems, vol. 16, No. 2, May 1998, pp. 170-205.

Jamison D. Collins et al., "Dynamic Speculative Precomputation," In the Proceedings of the 34th International Symposium on Microarchitecture, Dec. 2001, 12 pages.

Jamison D. Collins et al., "Speculative Precomputation: Long-range Prefetching of Delinquent Loads," In the Proceedings of the 28th International Symposium on Computer Architecture, Jul. 2001, 12 pages.

James Dundas et al., "Improving Data Cache Performance by Pre-executing Instructions Under a Cache Miss," Proc. 1997 ACM Int. Conf. on Supercomputing, Jul. 1997, 9 pages.

Murali Annavaram et al., "Data Prefetching by Dependence Graph Precomputation," 28th Intl. Symposium on Computer Architecture (ISCA 2001), Jul. 2001, 10 pages.

(Continued)

*Primary Examiner*—Reginald G. Bragdon
*Assistant Examiner*—Ngoc V Dinh
(74) *Attorney, Agent, or Firm*—Dorsey & Whitney LLP

(57) ABSTRACT

Predicting prefetch data sources for runahead execution triggering read operations eliminates the latency penalties of missing read operations that typically are not addressed by runahead execution mechanisms. Read operations that most likely trigger runahead execution are identified. The code unit that includes those triggering read operations is modified so that the code unit branches to a prefetch predictor. The prefetch predictor observes sequence patterns of data sources of triggering read operations and develops prefetch predictions based on the observed data source sequence patterns. After a prefetch prediction gains reliability, the prefetch predictor supplies a predicted data source to a prefetcher coincident with triggering of runahead execution.

54 Claims, 13 Drawing Sheets

OTHER PUBLICATIONS

Dongkeun Kim et al., "Design and Evaluation of Compiler Algorithms for Pre-Execution," Appears in Proceedings of the Tenth International Conference on Architectural Support for Programming Languages and Operations Systems (ASPLOS-X), Oct. 2002, San Jose, CA, 12 pages.

Steve S.W. Liao et al., "Post-Pass Binary Adaptation for Software-Based Speculative Precomputation," PLDI, Jun. 17-19, 2002, Berlin, Germany, pp. 117-128.

Martin Burtscher et al., "Static Load Classification for Improving the Value Predictability of Data-Cache Misses," PLDI, Jun. 17-19, 2002, Berlin, Germany, pp. 222-233.

Trishul M. Chilimbi et al., "Dynamic Hot Data Stream Prefetching for General-Purpose Programs," PLDI, Jun. 17-19, 2002, Berlin, Germany, pp. 199-209.

Onur Mutlu et al., "Runahead Execution: An Alternative to Very Large Instruction Windows for Out-of-order Processors," Ninth Intl. Symposium on High Performance Computer Architecture, Feb. 2003, 12 pages.

Ron Dreslinski et al., "RunaPred: A Hybrid Runahead/Value Prediction Approach," Apr. 18, 2003, 8 pages.

S. Vander Wiel et al., "A Survey of Data Prefetching Techniques," Technical Report No.: HPPC-96-05, Oct. 1996, pp. 1-26.

Suleyman Sair et al., "A Decoupled Predictor-Directed Stream Prefetching Architecture," pp. 1-32 (pp. 260-276, vol. 52, No. 3, in IEEE Transactions on Computers), Mar. 2003.

Doug Joseph et al., "Prefetching Using Markov Predictors," pp. 1-11 (pp. 252-263, in International Conference on Computer Architecture, Preceedings of the 24th Annual Intl. Symposium on Computer Architecture), Jun. 1-4, 1997.

\* cited by examiner

Prefetch Prediction Encoding
500

| Index | Triggering Read Operation Data Source | Predicted Data Source | Prediction Qualifier | Predicted Data Source | Prediction Qualifier |
|---|---|---|---|---|---|
| <hashed data source> | <data source> | <data source> | <counter> | <data source> | <counter> |
| ... | ... | ... | ... | ... | ... |

Prefetch Prediction Encoding
700

| Index | Trigger | Predicted Prefetch Data Source | Confidence |
|---|---|---|---|
| <hash address> | <address> | <address> | <counter> |
| Hash(&A[0,0]) | &A[0,0] | &A[1,0] | 1 |
| Hash(&A[1,0]) | &A[1,0] | -- | -- |
|  | -- | -- | -- |
|  | -- | -- | -- |

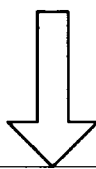

| Index | Trigger | Predicted Prefetch Data Source | Confidence |
|---|---|---|---|
| <hash address> | <address> | <address> | <counter> |
| Hash(&A[0,0]) | &A[0,0] | &A[1,0] | 1 |
| Hash(&A[1,0]) | &A[1,0] | &A[2,0] | 1 |
| Hash(&A[2,0]) | &A[2,0] | &A[3,0] | 1 |
| Hash(&A[3,0]) | &A[3,0] | -- | -- |

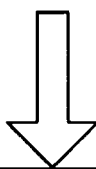

| Index | Trigger | Predicted Prefetch Data Source | Confidence |
|---|---|---|---|
| <hash address> | <address> | <address> | <counter> |
| Hash(&A[0,0]) | &A[0,0] | &A[1,0] | 3 |
| Hash(&A[1,0]) | &A[1,0] | &A[2,0] | 3 |
| Hash(&A[2,0]) | &A[2,0] | &A[3,0] | 3 |
| Hash(&A[3,0]) | &A[3,0] | -- | -- |

FIG. 7

PREFETCH PREDICTION

BACKGROUND

1. Field of the Invention

The present invention relates to the field of computers. More specifically, the present invention relates to computer architecture.

2. Description of the Related Art

Missing memory accesses have a large impact on overall performance in applications. The rapid increase in processor speed has generally led to latency that ranges from many hundreds to even thousands of processor clock cycles until an off-chip request is completed. With such substantial latency, relatively small miss rates, even 1% or lower, can significantly degrade application performance.

These missing memory accesses typically result from load instructions that miss in on-chip cache (e.g., L1 or L2 cache), and are serviced from off-chip cache or main memory. The load instructions that typically miss can be classified as clustered missing loads, distributed missing loads, or dependent missing loads. Clustered missing loads are those loads that miss and that are clustered together in the application with other loads that miss (i.e., given the current instruction is a missing load, there is a good probability that additional missing loads will be located in the next few hundred instructions to be issued). Distributed missing loads are those loads that are distributed throughout the application, without being close to other missing loads. Dependent missing loads are those loads with data sources or source addresses that are dependent on the data returned by previous missing loads (i.e., the missing loads are chained together). Dependent loads commonly occur during a linked list traversal.

If a memory access pattern is predictable, the loads are clustered, and the data sources of the loads are independent, it is possible for aggressive optimizing compilers, such as those provided by Sun Microsystems, Inc., to effectively insert prefetch instructions. The prefetch instructions move speculative data from load data sources into low-latency cache, such as on-chip cache, in advance of the use of the data. Since the data is already present in the low-latency cache, then the apparent latency of the load is reduced.

These optimizing compilers rely on profile data to insert prefetching instructions. In compiler-based prefetching, the compiler predicts a priori which loads are likely to miss the processor's off-chip caches. If the source address of the predicted missing load is known far in advance and the missing load is likely to be executed frequently, then the compiler inserts a software prefetch instruction for each missing load. Even advanced optimizing compilers rely on feedback profiling techniques to determine which memory accesses represent good candidates for prefetching.

Furthermore, automatic prefetch insertion by the compiler requires that the user leverage the appropriate optimization flags to enable prefetch insertion. Automatic prefetch insertion may also require the user to perform training runs to enable feedback profiling techniques. However, research has shown that the majority of users do not use the more aggressive optimization capabilities of the compiler, thus limiting the practical effectiveness of compiler-based prefetching in independent software vendor applications.

Hardware and software scanning techniques have been developed that address some of the limitations of compiler-based prefetching. Runahead execution (e.g., hardware scouting or software scouting), involve the processor "scouting" or speculatively executing past a missing load. When the load returns, the speculative path is aborted and execution continues at the use of the original missing load. When a load instruction misses, a processor switches from a normal execution mode into a hardware scouting mode. In scouting mode, the processor speculatively issues instructions from the predicted path of execution in an attempt to discover additional missing loads. By discovering the subsequent missing loads and prefetching for them, the subsequent missing loads can be processed in parallel with the first missing load, rather than in series, as would be the case for a processor without hardware scouting support. Hence, the total time expended waiting for a load request to be serviced from off-chip memory is reduced.

Software scouting is similar to hardware scouting, except the speculative execution and prefetching is performed using a code path that is generated by a static runtime compiler. The code path represents a possibly distilled forward path starting from the missing load. The code path contains those instructions necessary to calculate correct control flow and generate missing load source addresses and corresponding prefetches. A software scouting thread may either execute speculatively on an independent thread that runs in parallel with a master thread, or may be launched after the master thread is stalled by a missing load.

Both hardware and software scouting speculatively issue instructions from a predicted path of execution starting from the use of a missing load. Both scouting techniques can only execute a certain number of instructions before data for the missing load that triggered the scouting returns. This constraint limits the ability of scouting to look ahead and discover additional missing loads. Consequently, scouting is limited to discovering additional missing loads that are clustered with the triggering load. Additionally, as scouting moves further ahead, the probability that the projected execution path is still correct decreases, and the potential for prefetching source addresses that are not needed increases.

For example, assume a scout window of 250 instructions (i.e., a scouting mechanism is capable of executing 250 instructions before return of data). In a first scenario, a sequence of instructions includes 6 missing independent loads. The first missing load triggers transition of execution from normal mode to scout mode. During scout mode, the second and third missing loads (clustered loads) are encountered and, from the perspective of normal execution mode, prefetched. After a series of instructions, the third missing load triggers transition to scout mode. During scout mode, the fifth and sixth missing loads (clustered loads) are encountered and prefetching is performed for these missing loads. In the first scenario, the scouting mechanism has prefetched for 4 of the 6 missing loads and eliminated their corresponding miss penalties.

However, scouting cannot prefetch for dependent loads, despite clustering of the missing load instances. The first scenario assumed the missing load instances were independent. If the second missing load instance is dependent on an address requested by the first missing load instance, then scouting cannot prefetch for the second missing load instance because the address is unknown.

In a second scenario, a sequence of instructions includes three instances of missing loads. However, the missing load instances are distributed throughout the sequence of instructions, and each of the missing load instances falls outside of scout windows. The first missing load instance triggers a first transition to scout mode. After transition back to normal mode, the second missing load instance is encountered and triggers transition to scout mode. Once this scout mode ends and execution transitions back to normal mode, the third missing load instance is encountered. In this second scenario, scouting fails to discover the distributed missing load instances because they fall outside of the scout windows. Moreover, the divergence of the projected execution path during scouting from the correct execution path (e.g., due to branch mis-predictions, the diminishing probability that the values required for the address computation of distant missing loads are available) further limit the effectiveness of scouting with respect to distributed missing load instances.

Some techniques employ hardware context-based prefetch predictors and Markov prefetch predictors to eliminate L2 cache misses from clustered missing loads, distributed missing loads, and independent missing loads. These predictors use certain components of the current state of the processor and perhaps the history leading up to the current state to make predictions about the source address of the next missing load (next missing address). For instance, a typical Markov predictor maps the current missing address to the next predicted missing address that may be prefetched. In general, each predicted missing address is associated with an entry in prefetch predictions tables. Unfortunately, these context/ Markov prefetch predictors generally require large prediction tables (often many megabytes in size). Furthermore, the techniques that utilize these hardware prefetch predictors reserve large portions of on-chip cache for prediction tables. Accordingly, a technique is desired that addresses the latency penalties of missing loads that are not discovered by conventional scouting techniques and that is not burdened by impractical or undesirable prediction tables.

SUMMARY OF THE INVENTION

It has been discovered that context-based prediction can be used to eliminate a class of misses typically not addressed by runahead execution. Read operations that trigger transition to runahead execution (e.g., dependent missing read operations, distributed missing read operations) are identified, and the code unit that includes the identified triggering operations is dynamically modified to reference a prefetch predictor. The prefetch predictor predicts a next missing source address of a next triggering operation, and supplies the predicted next missing source address to a prefetcher. During runahead execution, the next triggering operation will not be encountered by the runahead execution because it is too distance from the trigger point, but the data is prefetched by the context based prefetch predictor. As the code unit executes, the code unit can be re-evaluated and dynamically modified to accommodate for possible changes and indicate which missing read operations trigger runahead execution.

These and other aspects of the described invention will be better described with reference to the Description of Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 1A depicts an exemplary looping code execution indicating data sources of triggering read operations to a prefetch predictor 103. FIG. 1B depicts an exemplary subsequent iteration of the code utilizing prefetched data.

FIG. 4A depicts an exemplary flowchart for developing and making prefetch predictions. FIG. 4B depicts an exemplary flowchart that continues from FIG. 4A.

FIG. 6A depicts exemplary marking of a code unit to indicate candidate triggering read operations. FIG. 6B depicts further exemplary code preparation. FIG. 6C depicts exemplary collection of performance information for candidate triggering read operations. FIG. 6D depicts exemplary refinement of the indicated candidate triggering read operations. FIG. 6E depicts exemplary prefetch prediction.

FIG. 7 depicts priming of an exemplary prefetch prediction encoding.

The use of the same reference symbols in different drawings indicates similar or identical items.

DESCRIPTION OF EMBODIMENT(S)

The description that follows includes exemplary systems, methods, techniques, instruction sequences and computer program products that embody techniques of the present invention. However, it is understood that the described invention may be practiced without these specific details. For instance, in the described realizations, code preparation may be performed by a combination of a compiler and a run-time optimizer, a runtime optimizer, a separate code preparation software tool, etc. In other instances, well-known protocols, structures and techniques have not been shown in detail in order not to obscure the invention.

The following description refers to triggering read operations. Triggering read operations are those read operations (e.g., load instructions) with at least one instance that triggers runahead execution of code. The triggering of runahead execution can be caused by the use of the date returned by the read operation missing in memory (i.e., a missing instance of the read operation). As previously described, missing read operations may be clustered, distributed, and/or dependent.

Figure 1A:
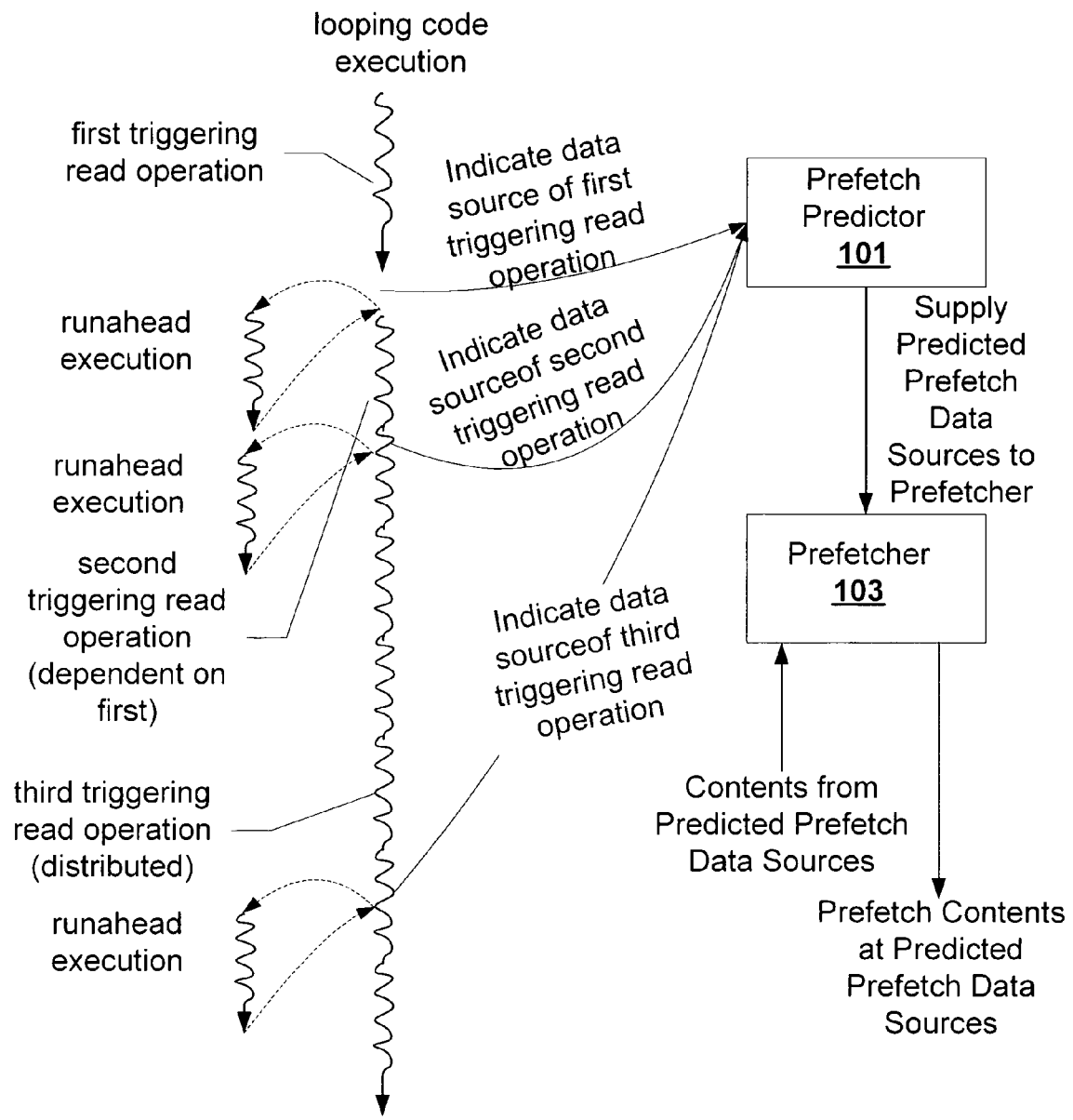
FIGS. 1A-1B depict exemplary interaction between runahead execution and prefetch prediction.
Figure 1B:
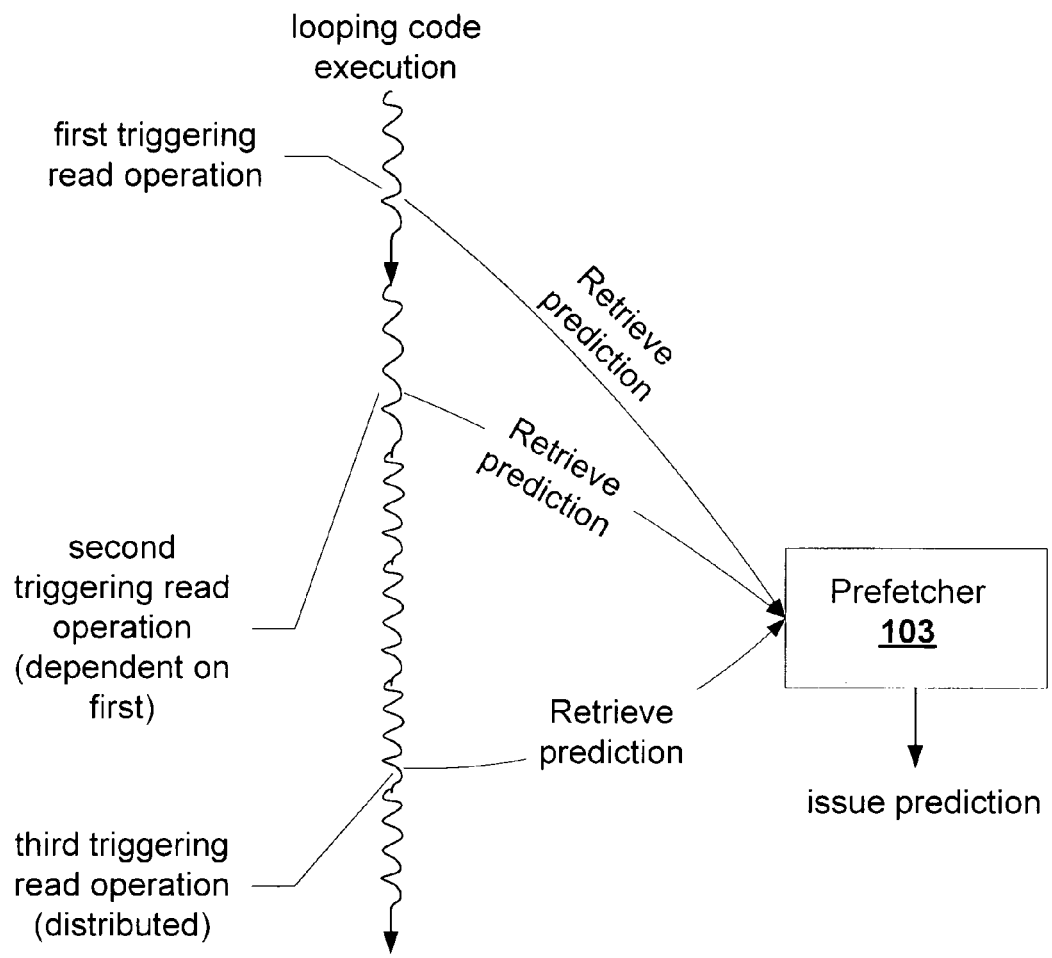

FIGS. 1A-1B depict exemplary interaction between runahead execution and prefetch prediction. FIG. 1A depicts an exemplary looping code execution indicating data sources of triggering read operations to a prefetch predictor 103. The executing code unit includes three triggering read operations in a looping sequence. Subsequent to encountering the first triggering read operation and after determining that the first triggering read operation misses, the data source of the first triggering read operation is indicated to a prefetch predictor 101. The prefetch predictor 101 may be implemented as software and/or hardware. After the data source of the first triggering read operation is indicated, execution of the code sequence transitions to a runahead execution mode. The second triggering read operation, which is dependent on the first triggering read operation, is encountered during the runahead execution, but cannot be speculatively executed. The second triggering read operation cannot be speculatively executed in runahead execution mode since the second triggering read operation depends on the first triggering read operation that missed, hence the source address for the second triggering read operation is unknown. After transitioning from runahead execution back to normal execution, the second triggering read operation is encountered in normal execution mode. Subsequent to encountering the second triggering read operation in normal execution mode, the data source of the second triggering read operation is indicated to the prefetch predictor 101. The data source of the second triggering read operation is now known because data for the first triggering read operation has returned. The second triggering read operation misses and triggers runahead execution. After transitioning back to normal execution mode, the third triggering read operation is encountered. As with the first and second triggering read operations, subsequent to encountering the third triggering read operation but prior to transition to runahead execution, the data source of the third triggering read operation is indicated to the prefetch predictor 101.

For each of the triggering read operations, data sources (i.e., memory addresses of the data requested by the triggering read operations) are indicated to the prefetch predictor 101. The prefetch predictor 101 determines a predicted prefetch data source corresponding to the indicated triggering read operation data source and supplies the predicted prefetch data source to a prefetcher 103. The prefetcher 103 (e.g., software prefetcher, hardware prefetcher, combination of hardware and software, etc.) prefetches contents from the predicted prefetch data sources. Contents of the predicted prefetch data sources are supplied to the prefetcher 103.

FIG. 1B depicts an exemplary subsequent iteration of the code utilizing prefetched data. In the subsequent iteration, the first triggering read operation retrieves a prediction from the prefetcher 103. Similarly, the second and third triggering read operations retrieve their respective predictions from the prefetcher 103. Assuming that the prefetch predictions are correct and that the first, second, and third triggering read operations do not miss, then their data, in addition to any missing read operations discovered and prefetched during runahead execution, will be available. Hence performance of the code is improved by eliminating latency penalties from both the triggering read operations and those missing read operations discovered and prefetched during runahead execution.

Coupling prefetch prediction and runahead execution involves code preparation, and development and maintenance of prefetch prediction information. The code preparation may include profiling a code unit, marking candidate triggering read operations based on the profiling, and identifying particular ones of the candidate read operations as triggering read operations (e.g., those candidate read operations that satisfy a given criteria, such as threshold number of misses during a profiling execution). After the code has been prepared, developing and maintaining prefetch prediction information may include 1) priming a prefetch prediction encoding, and 2) maintaining the prefetch prediction encoding. Furthermore, at least some of the code preparation may be repeated to reevaluate the code (e.g., to adjust to phase changes in the code).

Code Preparation

For code preparation, a profiler may be utilized to profile a code unit. The profiler can determine those read operations of the code unit most likely to miss frequently. The candidate triggering read operations identified based on performance information garnered by the profiler can be utilized to further refine identification of triggering read operations.

Figure 2:
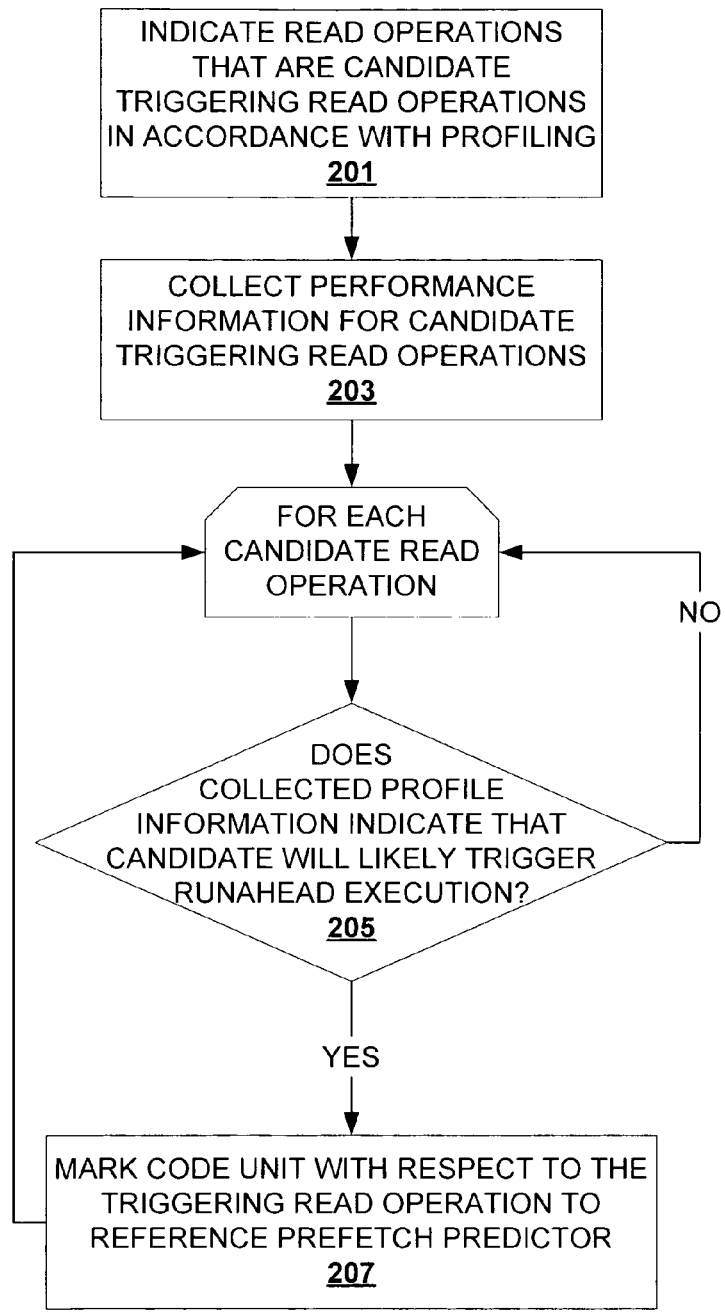
FIG. 2 depicts an exemplary flowchart for indicating triggering read operations.

FIG. 2 depicts an exemplary flowchart for indicating triggering read operations. At block 201, read operations that are candidate triggering read operations are indicated in accordance with profiling. At block 203, performance information for the candidate triggering read operations is collected. For example, code for each of the candidate triggering read operations maintains respective counters tracking misses. For each of the candidate read operations, blocks 205 and 207 are performed. At block 205, it is determined if the collected performance information indicates that the candidate triggering read operation will likely trigger runahead execution during runtime. For example, the candidate triggering read operation is deemed likely to trigger runahead execution if a miss counter exceeds a miss threshold. If the collected profile information does not indicate that the candidate triggering read operation will likely trigger runahead execution, then processing advances to the next candidate triggering read operation. If the collected profile information does indicate that the candidate triggering read operation will likely trigger runahead execution, then control flows to block 207. At block 207, the code unit is marked, with respect to the triggering read operation, to reference a prefetch predictor.

Figure 3:
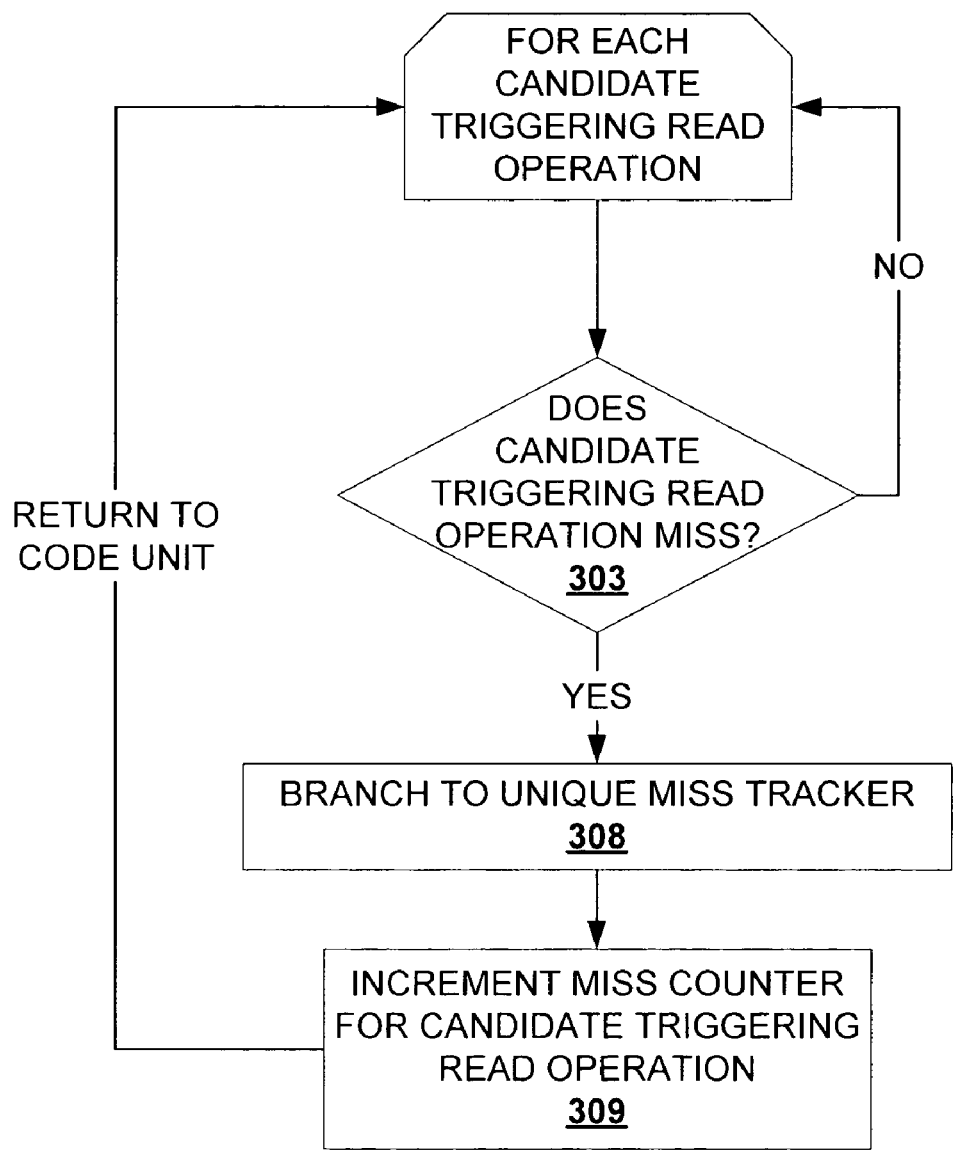
FIG. 3 depicts an exemplary flowchart for collecting performance information for candidate triggering read operations.

FIG. 3 depicts an exemplary flowchart for collecting performance information for candidate triggering read operations. Each candidate triggering read operation is augmented with a unique code that determines if the candidate triggering read operation is a triggering read operation in a particular invocation (e.g., the unique code maintains performance counters). For each candidate triggering read operation, the following is performed. At block 303, it is determined if a candidate triggering read operation misses. If the candidate triggering read operation does not miss, then control flows to the next candidate triggering read operation. If the candidate triggering read operation does miss, then control flows to block 308. At block 308, program control branches to a miss tracker unique to the corresponding candidate triggering read operation. At block 309, a miss counter of the candidate triggering read operation is incremented by the candidate triggering read operation's miss tracker. From block 309 control returns to execution of the code unit and collection of performance information proceeds to the next candidate triggering read operation.

Developing and Making Prefetch Predictions

In predicting, information is collected from observing code behavior and identifying repetitious and consistent code behavior. Typically, reliability of a prediction increases in proportion to the consistent and repetitious behavior of code. For prefetch predictions, patterns of data sources (i.e., memory locations) of triggering read operations as they occur during execution is observed and tracked.

Figure 4A:
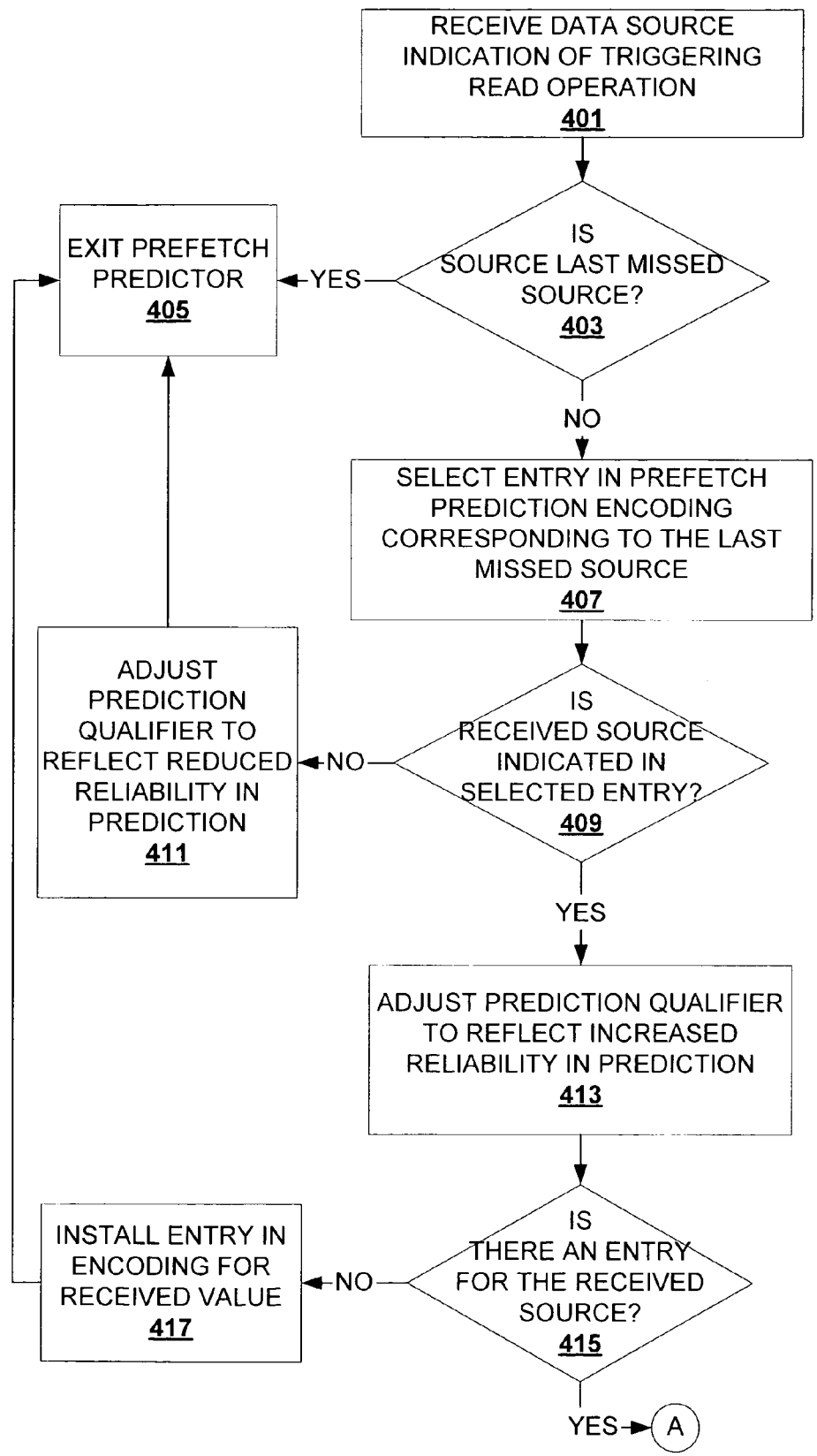
FIGS. 4A-4B depict an exemplary flowchart for developing and making prefetch predictions.
Figures 4B, 5:
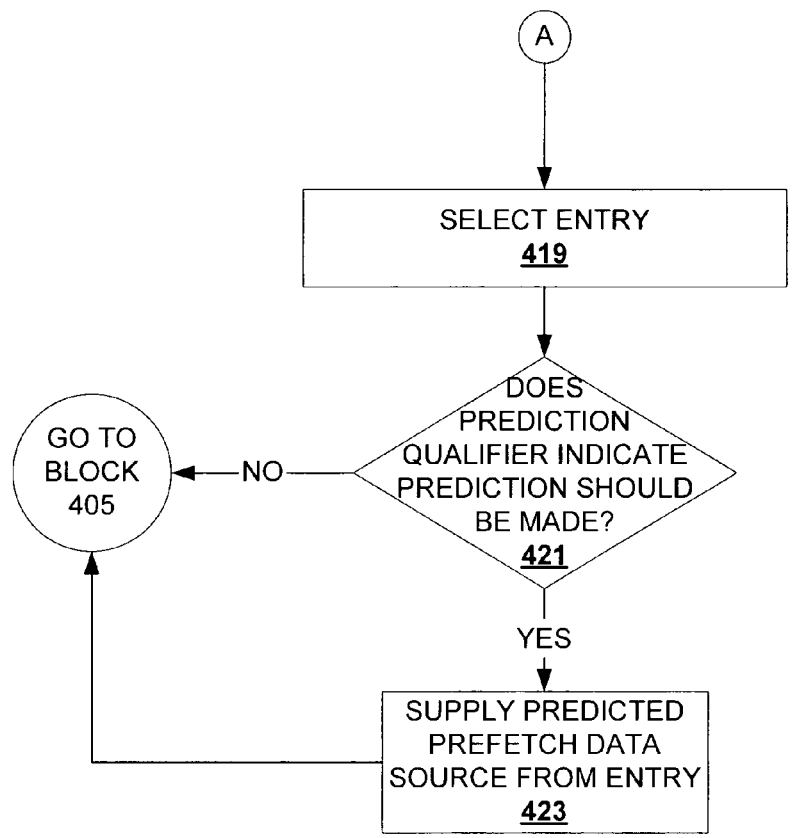
FIG. 5 depicts an exemplary prefetch prediction encoding.

FIGS. 4A-4B depict an exemplary flowchart for developing and making prefetch predictions. FIG. 4A depicts an exemplary flowchart for developing and making prefetch predictions. At block 401, a data source indication of a marked triggering read operation is received. At block 403, it is determined if the data source is the last missed data source for the marked triggering read operation. If the received data source is the last missed data source, then control flows to block 405. If the received data source is not the last missed data source, then control flows to block 407.

At block 405, the prefetch predictor is exited. For example, control returns to a calling code unit.

At block 407, an entry in a prefetch prediction encoding corresponding to the last missed data source for the marked triggering read operation is selected. At block 409, it is determined if the received data source is indicated in the selected entry. If the received data source is not indicated in the selected entry, then control flows to block 411. If the received data source is indicated in the selected entry, then control flows to block 413.

At block 411, a prediction qualifier is adjusted to reflect reduced reliability in the prediction (e.g., a confidence value is decremented). Control flows from block 411 to block 405.

At block 413, a prediction qualifier is adjusted to reflect increased reliability in the prediction (e.g., a confidence value is incremented). At block 415, it is determined if there is an entry for the received data source. If there is not an entry for the received data source, then control flows to block 417. If there is an entry for the received data source, then control flows to block 419.

At block 417, an entry is installed in the prefetch prediction encoding for the received value. Control flows from block 417 to block 405.

FIG. 4B depicts an exemplary flowchart that continues from FIG. 4A. At block 419, the entry for the received data source is selected. At block 421, it is determined if the prediction qualifier indicates that a prediction should be made. If a prediction should be made, then control flows to block 423. If a prediction should not be made according to the prediction qualifier, then control flows back to block 405. At block 423, a predicted prefetch data source is supplied from the selected entry. Control flows from block 423 to block 405.

While the flow diagrams show a particular order of operations performed by certain realizations of the invention, it should be understood that such order is exemplary (e.g., alternative realizations may perform the operations in a different order, combine certain operations, overlap certain operations, perform certain operations in parallel, etc.). For example, in FIG. 4A, operations to determine whether or not to install an entry for a received data source may be performed before operations are performed that determine whether a prediction should be made.

FIG. 5 depicts an exemplary prefetch prediction encoding. An exemplary prefetch prediction encoding 500 indicates indices, triggering read operation data sources, and prefetch predictions. In the prefetch prediction encoding 500, each of the entries indicates multiple predictions. Each entry in the prefetch prediction encoding 500 is indexed with a hash of a marked triggering read operation's data source. Once an entry is selected with a hash, the entry is then verified against the indicated triggering read operation data source. Each prefetch prediction includes a predicted data source and a prediction qualifier. The exemplary prefetch prediction encoding is illustrated to aid in understanding the described invention. The encoding may be implemented with a variety of data structures or combination of data structures.

Figure 6A:
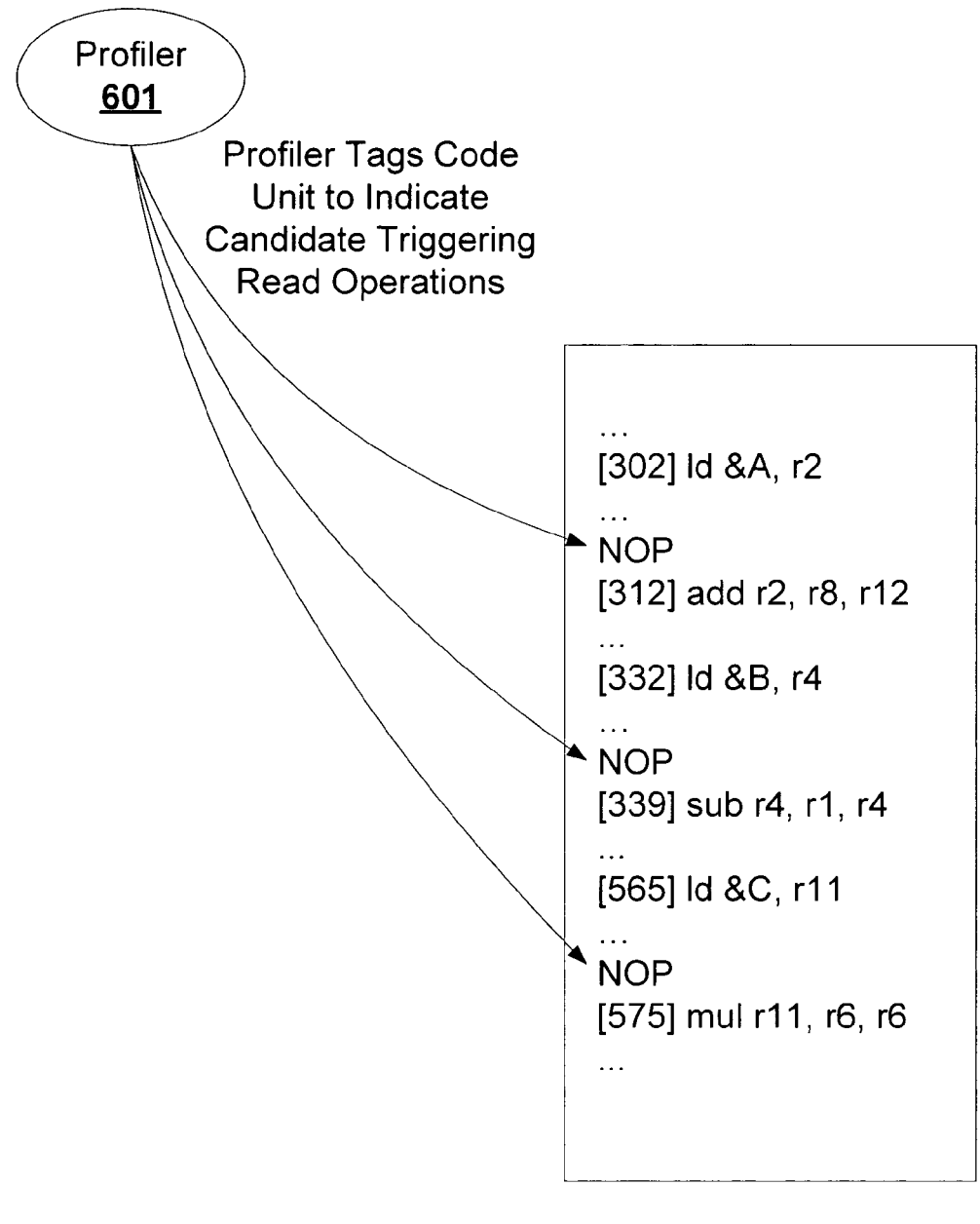
FIGS. 6A-6E depict exemplary preparation of a code unit and prefetch prediction for the code unit.

FIGS. 6A-6E depict exemplary preparation of a code unit and prefetch prediction for the code unit. FIG. 6A depicts exemplary marking of a code unit to indicate candidate triggering read operations. A profiler 601 tags a code unit 603A to indicate candidate triggering read operations. The profiler 601 projects that three load instructions of the code unit 603A are likely to frequently miss and trigger runahead execution. The profiler 601 inserts neutral instructions subsequent to each of the load instructions, but before first utilization of each of the load instructions. The exemplary neutral instructions illustrated in FIG. 6 are NOP instructions, but may be any of a number of instructions that do not affect architected state (i.e., committed state). The resulting exemplary code unit appears as follows:

In this example, each of the neutral instructions are inserted a distance from their respective load instruction sufficient to determine whether or not the load instruction misses. For example, if the instructions are executed on a processing unit that takes 8 cycles to access L2 cache, then the neutral instructions will be placed subsequent to a series of instructions that will at least take approximately 8 cycles to execute. Additionally, delay can be implemented by the prefetch predictor. For example, neutral instructions (delaying neutral instructions) may be inserted within code, which implements the prefetcher, in order to consume execution time. For example, multiply instructions that do not affect execution state may be added to prefetch predictor code.

Figure 6B:
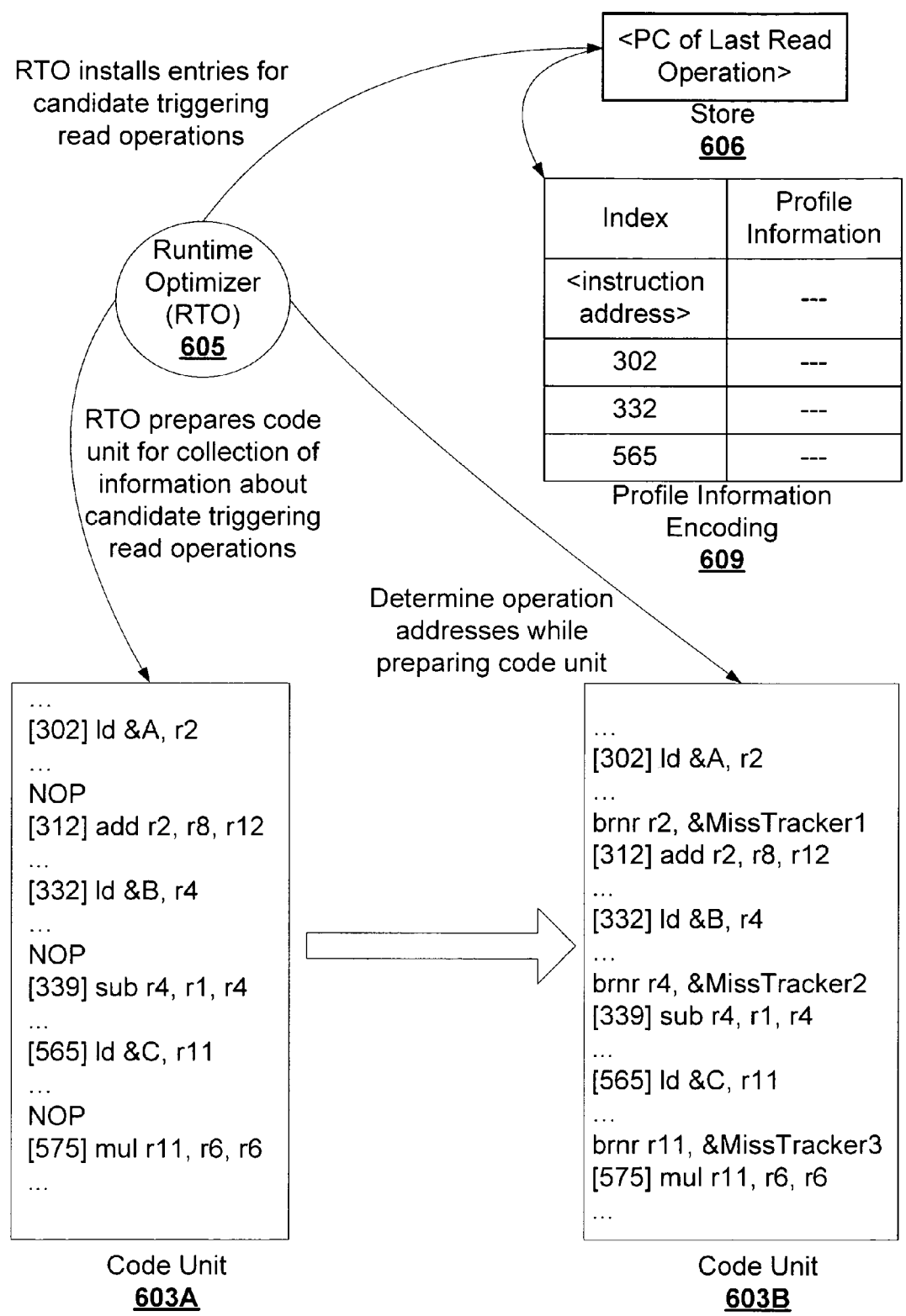

FIG. 6B depicts further exemplary code preparation. A run-time optimizer (RTO) 605 prepares the code unit 603A for collection of performance information about the candidate triggering read operations previously tagged with NOP instructions. As the code unit 603A is executed, the RTO 605 keeps track of the address of the last read operation it encounters. In FIG. 6B, a store 606 is depicted as hosting the program counter of each read operation encountered by the run-time optimizer 605. If the RTO 605 encounters a tagging NOP instruction, then the RTO 605 installs an entry for the read operation indicated in the store 606 into a profile information encoding 609. The exemplary profile information encoding 609 is indexed by instruction addresses and indicates profile information for each of the indicated instruction addresses. Coincident with installing an entry in the profile information encoding 609, the RTO 605 replaces each of the tagging NOP instructions with a conditional control transfer type instruction, such as a branch-on-register-not-ready (brnr) instruction (if the data for the data source is still pending, then the branch is taken). Each of the branch-on-register-not-ready instructions indicates source operands and a branch target. The indicated source operand corresponds to the destination operand of the corresponding candidate triggering read operation. The branch target indicates location of unique miss tracking code (referred to in FIG. 6B as MissTracker#) that corresponds to the candidate triggering read operation. The unique characteristic of a candidate triggering read operation's miss tracking code at least includes awareness of particular address information. The unique miss tracking code is aware of the candidate missing read operation's source address and a return address (i.e., the program counter of the tagged instruction). For example, a unique miss tracking code copies the candidate triggering read operation's address to a known store location and the return address to a known store location (e.g., known register). The modified code unit 603A is referenced as a code unit 603B. If the corresponding candidate triggering read operation missed the low-latency memory (e.g., on-chip cache), then the source operand of a branch-on-register-not-ready instruction is not ready.

Figure 6C:
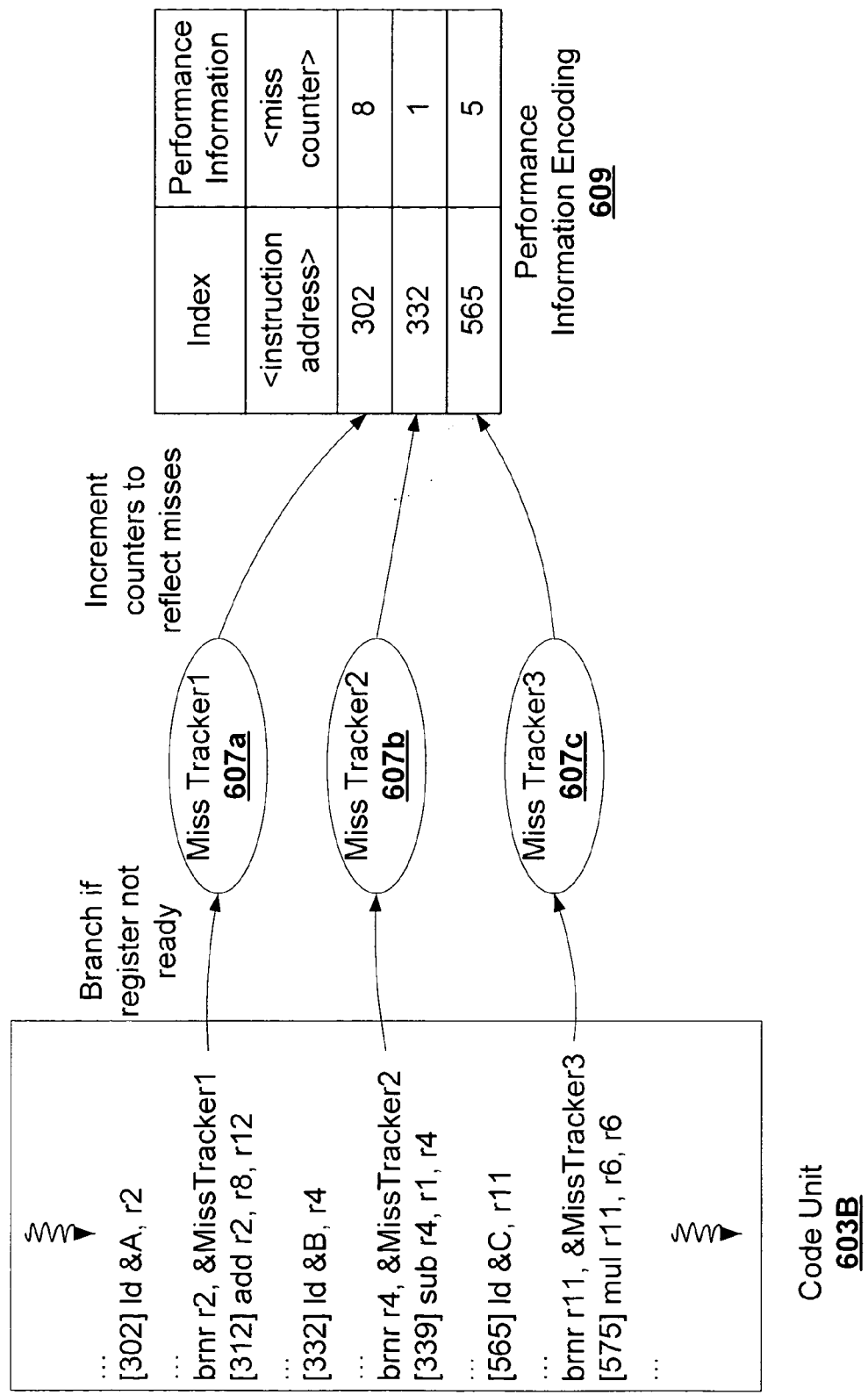

FIG. 6C depicts exemplary collection of performance information for candidate triggering read operations. During execution of the code unit 603B, when the first brnr instruction is encountered, if the indicated source operand register is not ready, then execution branches to a unique miss tracker 607a. Likewise, when each of the brnr instructions are encountered, if their indicated source operand register is not ready, then control branches to Miss Tracker2 607b and Miss Tracker 607c, respectively. Each unique miss tracker, which may leverage part of the RTO 605, accesses the performance information encoding 609 and increments the appropriate missed counter. A variety of techniques may be utilized to access the performance information encoding 609. For example, a store may be updated, as each read operation is encountered, with the read operation's source address. The performance information collector 607 accesses the store location in order to select the appropriate entry in the performance information encoding 609. As the sequence of the code unit 603B that includes the exemplary triggering read operations is repeated, the unique miss trackers 607a-607c update the performance information encoding 609 to track each miss.

Figure 6D:
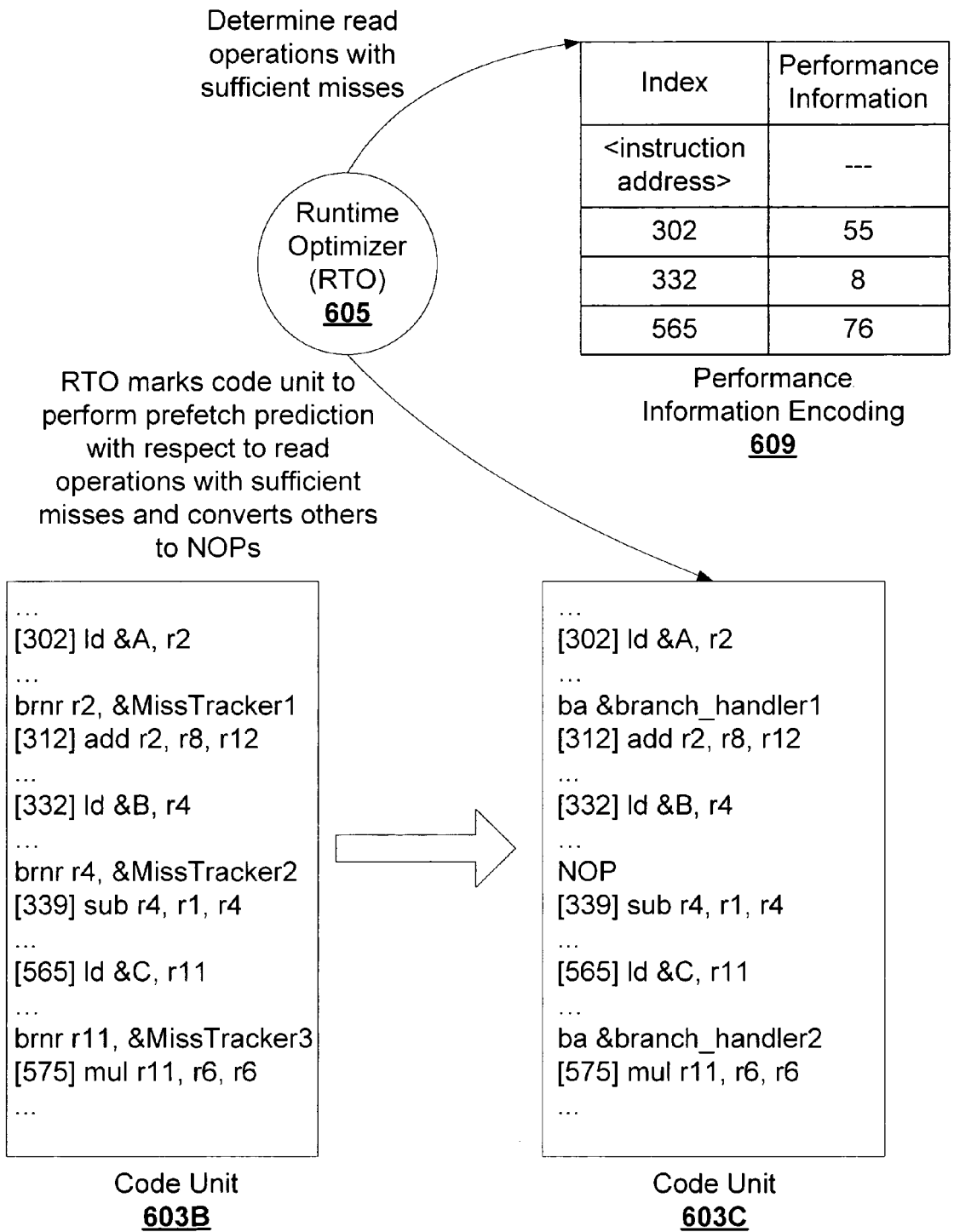

FIG. 6D depicts exemplary refinement of the indicated candidate triggering read operations. As the code unit 603B executes and the performance information encoding 609 is updated, the RTO 605 determines if performance information for the candidate triggering read operations indicated in the performance information encoding 609 satisfies runahead execution triggering criteria. For example, the RTO 605 determines if the read operation's missed counter exceeds a predefined miss threshold. If the RTO 605 determines that a read operation's missed counter exceeds the predetermined miss threshold, then the RTO 605 marks the code unit to perform prefetch prediction with respect to the read operation that satisfies the run ahead triggering criteria. Various realizations of the described invention will implement operations to monitor whether performance information for candidate triggering read operations satisfies runahead execution triggering criteria. For example, the unique miss trackers may check on the performance counters as they increment the performance counters. If incrementing a performance counter causes the performance counter to equal and/or exceed the runahead execution triggering criteria, then the unique miss tracker marks the corresponding candidate triggering read operation (replaces the brnr instruction with a branch always instruction), notifies the RTO, etc. In FIG. 6D, the RTO 605 replaces those branch-on-register-not-ready instructions that correspond to candidate triggering read operations that exceed the miss threshold with branch always instructions that indicate a branch target of a unique code that performs prefetch prediction operations, invokes a prefetch predictor, etc. The modified code unit 603B is identified as a code unit 603C.

Figure 6E:
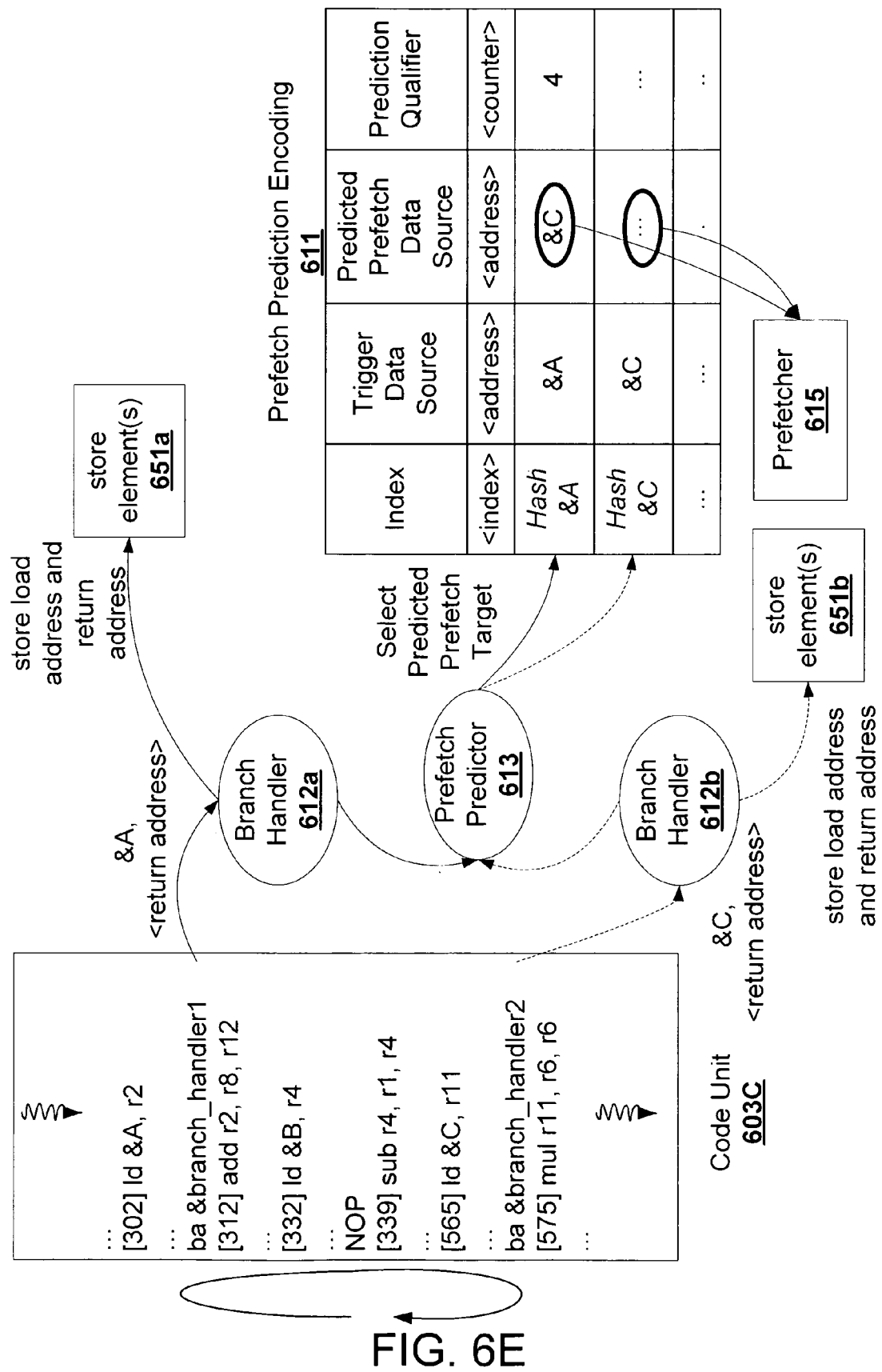

FIG. 6E depicts exemplary prefetch prediction. As the code unit 603C is executed, the repeat execution of the exemplary triggering read operations causes development of predictions and a prefetch prediction encoding 611. As a code unit 603C is executed, the prefetch prediction encoding 611 becomes populated with data sources of the triggering read operations and their predictions. The prefetch prediction encoding 611 indicates an index, the trigger data source, a predicted prefetch data source, and a prediction qualifier. Various realizations of the described invention can access a prefetch prediction encoding differently. In this example, the index is a hash of the trigger data source in the exemplary encoding. The trigger data source is the data source of the triggering read operation that has been marked. The predicted prefetch data source is the data source of a following triggering read operation observed as occurring during run-time subsequent to the trigger data source. Various techniques may be implemented to track the data sources of the corresponding triggering read operations. For example, as each triggering read operation is encountered, a store location is updated with the data source of an encountered read operation. In FIG. 6E, a prediction qualifier is a saturating counter incremented with each observation of the data source pattern occurrence (i.e., confidence or strength value). During code execution, upon encountering each branch always instruction, a corresponding branch handler is activated. In FIG. 6E, the first branch always instruction branches to a branch handler 612a. The branch handler 612a is supplied the data source of the corresponding triggering read operation and a return instruction address (&A). The branch handler 612a stores the supplied return address in a store element(s) 651a (e.g., one or more registers). The branch handler 612a invokes a prefetch predictor 613.

The prefetch predictor 613 accesses the prefetch prediction encoding 611 with a hash of the address of location A. Assuming the qualifier satisfies the prediction threshold, the predicted prefetch data source address for memory location C (observed as following memory location A), is supplied to the prefetcher 615. Similarly, upon encountering the second exemplary branch always instruction, which corresponds to the load operation at instruction address 565, program control branches to a branch handler 621b. The branch handler 621b is supplied the data source (&C) and a return instruction address. The branch handler 621b stores the supplied return address in a store element(s) 651b (e.g., one or more registers that may or may not be in a register file that includes the store element(s) 651a). The branch handler 621b invokes the prefetch predictor 613 and the prefetch predictor 613 performs operations similar to those already described, except with the data source &C. Various realizations of the described invention implement the branch handler functionality and prefetch prediction selection differently. For example, generic prefetch predictor code may be leveraged by control return tracking code specific to triggering read operations, the functionality for accessing a prefetch prediction encoding, selecting an entry, and supplying a prediction to a prefetch may be integrated with the specific control return tracking code, etc.

FIG. 7 depicts priming of an exemplary prefetch prediction encoding. Similar to FIG. 5, a prefetch prediction encoding 700 of FIG. 7 includes entries for triggering read operation data sources. However, the prefetch prediction encoding 700 depicts a single prediction instead of multiple predictions to simplify the illustration and aid in understanding the invention. The prefetch prediction encoding 700 indicates predictions for a triggering read operation and corresponds to the following code:

```
i = 0; j = 0; cond = 1;
while (cond) {
    curr_ptr = A[j, i];              //triggering read operation
    while (curr_ptr->val == 0)       {//use of triggering miss causes
                                     //transit to runahead execution
        curr_ptr = A[j, i++];
    }
    cond = f(curr_ptr->val, cond);
    j++; i = 0;
}
```

In the above code example, upon entering the outer loop, a triggering read operation references an array element A[0,0], which results in a L2 cache miss. Since the triggering read operation has been identified by an RTO, execution branches, via the branch always instruction inserted by the RTO, to prefetch code for the read operations, following the execution of the load. On a first iteration, the predictor determines that an entry for the address A[0,0] does not currently exist in the prefetch prediction encoding and, since the trigger read operation misses in L2 cache (determined using the techniques previously described), the address for A[0,0] is inserted into the prefetch encoding. At this time, there are no predictions with this trigger address. After executing the prefetch predictor, execution continues and the code attempts to use the data returned by the triggering missing read operation. The miss causes transition to runahead execution (e.g., hardware scout mode). Since the result of trigger miss is required to load the value used to test for loop termination, it is not possible to resolve the loop terminating condition. Consequently, in runahead execution, the branch predictor must be used to dictate the execution path. As a result, runahead execution will continue to execute this loop indefinitely, never exiting from the inner while loop. Once data requested by the triggering missing read operation returns, execution will transition back to normal execution, the inner loop will be re-executed, and at some point the exit criteria of the first loop will be met. The inner loop will be exited and a new value of cond will be generated. If cond is nonzero, the outer-while loop will be re-executed and triggering load operation will again be executed. This time the read operation references A[1,0] and again this results in a L2 cache miss. The prefetch predictor will again be executed and will perform two operations: 1) enters A[1,0] into the prediction encoding, and 2) enters A[1,0] as a prediction for A[0,0] since the triggering miss for A[1,0] followed the miss at A[0,0]. In addition, the prefetch predictor sets a prediction qualifier to indicate low confidence currently associated with this prediction (this pattern has only been observed once so far). The state of the prefetch prediction encoding after this iteration is illustrated in the first instance of the prefetch protection encoding 700. The same sequence of events is repeated again—and the runahead execution continuously iterates on the inner-while loop and fails to discover triggering read operation A[2,0] for the next iteration. During the next iteration, the same behavior is repeated, until, after multiple iterations, the prediction encoding contains information as illustrated in the second instance of the prefetch prediction encoding 700 in FIG. 7.

At some point a zero value of cond will be generated, causing the code to exit the outer while loop. If, at some point in the future, this code is re-executed, the same behavior is again exhibited, and the same sequence of triggering read operations missing is observed, the confidence associated with the prefetch predictions and the prefetch prediction encoding will increase. If the outer loop is again executed, the confidence in the prefetch prediction is now sufficient to allow prefetches to be issued (assuming in this example that a prediction qualifier of 2 is the low watermark for issuing prefetches). For the next iteration of the outer loop, triggering read operation requests A[0,0]. Using this address to index into the prefetch prediction encoding, the prefetch predictor predicts that the next trigger miss will be encountered is A[1,0]. The prefetch predictor then issues the prefetch for this address.

Consequently, for the next iteration, the triggering read operation's request for A[1,0] will not miss the processor's on-chip cache. However, because the RTO associated a branch always instruction with the triggering read operation, the prefetch predictor will still be executed. The qualifier associated with the A(1,0) prefetch prediction for A[0,0] will again be incremented due to the success associated with this prediction. Additionally, address A[1,0] is used to index into the table. The prefetch prediction associated with A[1,0] now also has sufficient confidence, causing a prefetch to be issued for A[2,0].

This pattern is repeated, with the prefetch predictor 1) issuing prefetches for the address required by a triggering read operation for the next iteration and eliminating the cache misses originally encountered, and 2) increasing the confidence associated with the predictions, when, during the next iteration, the predictions are found to be correct. This leaves the prefetch prediction encoding 700 in the state illustrated in the third instance of the prefetch prediction encoding 700.

In the above example, for a common case of nested loops, it is illustrated that a lightweight prefetch predictor can correctly eliminate misses associated with triggering read operations resulting in a significant performance improvement for the code sequence. Furthermore, for this example, runahead execution techniques are unable to eliminate the L2 cache miss associated with triggering read operation.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 8:
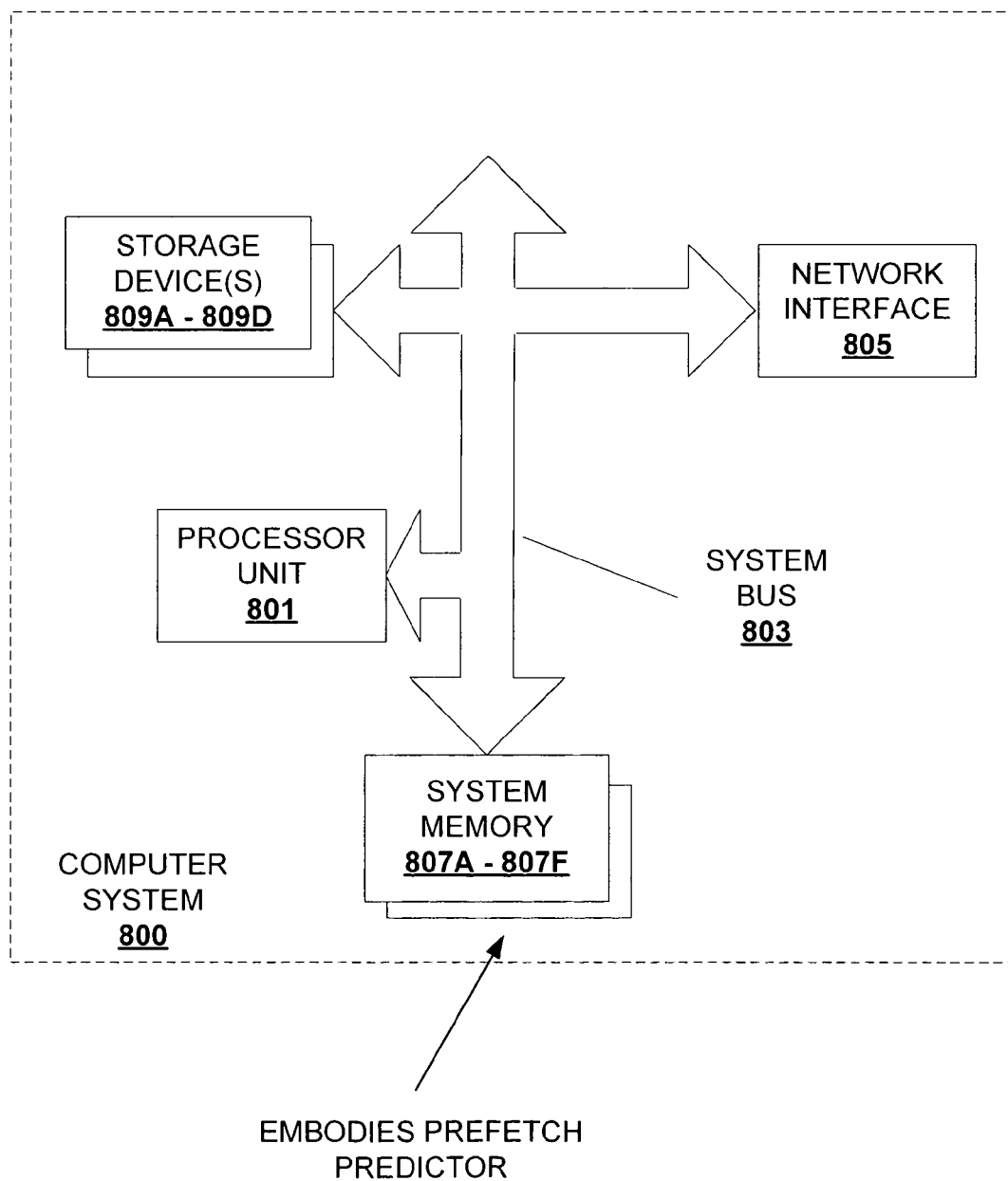
FIG. 8 depicts an exemplary computer system according to realizations of the invention.

FIG. 8 depicts an exemplary computer system according to realizations of the invention. A computer system 800 includes a processor unit 801 (possibly including multiple processors). The computer system 800 also includes a system memory 807A-807F (e.g., one or more of cache, SRAM DRAM, RDRAM, EDO RAM, DDR RAM, EEPROM, etc.), a system bus 803 (e.g., LDT, PCI, ISA, etc.), a network interface 805 (e.g., an ATM interface, an Ethernet interface, a Frame Relay interface, etc.), and a storage device(s) 809A-809D (e.g., optical storage, magnetic storage, etc.). Realizations of the invention may include fewer or additional components not illustrated in FIG. 8 (e.g., video cards, audio cards, additional network interfaces, peripheral devices, etc.). The processor unit 801, the storage device(s) 809A-809D, the network interface 805, and the system memory 807A-807F are coupled to the system bus 803. The system memory 807A-807F includes a prefetch predictor. The prefetch predictor and/or prefetch prediction encoding may be embodied completely or partially within the system memory 807A-807F, the processor unit 801, another processor unit, etc.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, the blocks and logic units identified in the description are for understanding the described invention and not meant to limit the described invention. Functionality may be separated or combined in blocks differently in various realizations of the invention or described with different terminology. For example, an operation fetch unit may be referred to as an instruction fetch unit, an instruction buffer may perform some or all of the functionality of the operation fetch unit, the operation scheduling unit, and/or the renaming unit, the memory disambiguation buffer may be referred to as a data hazard resolution unit, the memory disambiguation buffer may include a data hazard resolution unit, etc.

These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A hardware prefetch predictor that includes a prefetch prediction encoding, that indicates in the prefetch prediction encoding a data source of a first runahead execution triggering read operation, a predicted data source for a second runahead execution triggering read operation, and a prefetch prediction qualifier, and that supplies the predicted data source to a prefetcher, wherein the prefetch prediction qualifier is based, at least in part, on prior runtime observance of the predicted data source occurring subsequent to the occurrence of the first runahead execution triggering read operation's data source.

2. The hardware prefetch predictor of claim 1 further comprising the prefetch predictor modifying a code unit to reference the prefetch predictor, wherein the code unit includes the triggering read operations.

3. The hardware prefetch predictor of claim 1, wherein the data source indications include one or more of virtual addresses and physical addresses.

4. The hardware prefetch predictor of claim 1, wherein the read operations include one or more of a load instruction, a load halfword instruction, load offset instruction, and a load multiple instruction.

5. The hardware prefetch predictor of claim 1, wherein the triggering read operations include read operations indicated as missing beyond a given miss threshold during a prior execution of the code unit.

6. The hardware prefetch predictor of claim 1, wherein the prefetcher includes a hardware prefetcher, a software prefetcher, or a hardware/software prefetcher.

7. A method comprising:
identifying a plurality of data sources triggering runahead execution of a code unit;
modifying a prefetch prediction qualifier based on prior runtime observance of the data sources triggering runahead execution of the code unit;
predicting prefetch data sources coincident with triggering runahead execution of the code unit; and
retrieving data for read operations of the code unit in accordance with the predicted prefetch data sources and the runahead execution.

8. The method of claim 7 further comprising profiling the code unit and determining the read operations as frequently missing in memory.

9. The method of claim 8, wherein the missing read operations include one or more of clustered missing read operations, distributed missing read operations, and dependent missing read operations.

10. The method of claim 7 further comprising modifying the code unit to indicate a prefetch predictor proximate with the read operations.

11. The method of claim 7, wherein the prefetch data source predictions include one or more of physical addresses and virtual addresses.

12. The method of claim 7, wherein the runahead execution includes hardware scouting, software scouting, or both hardware and software scouting.

13. A machine-readable storage medium having stored thereon computer-executable instructions, which when executed, perform the method of claim 7.

14. A method comprising:
indicating a set of read operations, at least some instances thereof triggering runahead execution of a code unit that includes the set of read operations;
predicting a first data source for an instance of a first of the set of read operations based, at least in part, on the first data source occurring, during execution of the code unit, subsequent to a second data source of an instance of a second of the set of read operations;
tracking runtime occurrences of the first data source, at least with respect to the second data source;
modifying a prediction qualifier in accordance with said tracking, the prediction qualifier indicating whether the first data source should be supplied as a predicted data source for prefetching; and
prefetching the predicted data source.

15. The method of claim 14 further comprising determining the set as those read operations of the code unit that miss greater than a given miss threshold.

16. The method of claim 15 further comprising identifying the read operations as read operations that satisfy one or more profiling criteria that correlate with frequently missing in memory.

17. The method of claim 14, wherein the data source predictors include one or more of physical addresses and virtual addresses.

18. A machine-readable storage medium having stored thereon computer-executable instructions, which when executed, perform the method of claim 7.

19. A method comprising:
indicating a set of one or more read operations in a first code unit;
inserting conditional control transfer operations proximate to respective ones of the set of read operations; and
while executing the first code unit, dynamically modifying the first code unit to include one or more references that correspond to one or more prefetch predictor code units executable to predict data sources for prefetching.

20. The method of claim 19 further comprising determining the set of read operations as exceeding a miss threshold.

21. The method of claim 20, wherein the miss threshold corresponds to triggering of runahead execution.

22. The method of claim 20 further comprising determining from code performance information those of a second set of read operations, which at least includes the set of read operations, that satisfy criteria corresponding to triggering of runahead execution.

23. The method of claim 19, wherein the conditional control transfer operations include branch-on-register-not-ready operations.

24. The method of claim 23, wherein the branch-on-register-not-ready operations branch to a branch target that corresponds to respective profile information collecting code units, if their indicated registers, which correspond to respective ones of the read operations, are not ready.

25. The method of claim 24, wherein the profile information collecting code units are executable to at least track misses for their respective read operations.

26. The method of claim 19, further comprising:
marking at least the set of read operations with neutral operations; and
replacing the neutral operations with the conditional control transfer operations.

27. The method of claim 19, wherein said dynamically modifying the first code unit comprises replacing at least one of the conditional control transfer operations with a control transfer operation that transfers control to a prefetch predictor code unit.

28. The method of claim 27, wherein those of the conditional control transfer operations replaced with the control transfer operations are those conditional control transfer operations that indicate read operations which satisfy criteria for triggering runahead execution.

29. The method of claim 28, wherein the criteria include a threshold number of misses.

30. The method of claim 19, wherein the prefetch predictor code units include branch handling operations particular to each of the set of read operations.

31. The method of claim 19, wherein each of the references reference a branch handling code unit that at least stores an instruction address of a corresponding one of the set of read operations, that stores a return address, and that references a prefetch predictor code unit.

32. The method of claim 19 further comprising:
re-evaluating performance of at least the read operations of the first code unit; and
dynamically modifying the first code unit to reference the prefetch predictor code unit in accordance with said re-evaluating.

33. The method of claim 32, wherein re-evaluating performance comprises determining those of the read operations that miss greater than a given threshold.

34. A machine-readable storage medium having stored thereon computer-executable instructions, which when executed, perform the method of claim 7.

35. An apparatus comprising:
a hardware prefetch predictor operable to, host data sources of read operations having at least one instance that triggers a runahead execution mode, host data source predictions for read operations having at least one instance that triggers runahead execution mode, and host prefetch prediction qualifiers, further operable to receive a data source indication, operable to modify the prefetch prediction qualifiers based on detected patterns in the data sources of read operations that trigger runahead execution mode, and output a predicted data source that corresponds to a received data source indication; and
a prefetcher coupled with the hardware prefetch predictor, the prefetcher operable to receive a predicted data source from the hardware prefetch predictor and to prefetch contents therefrom.

36. The apparatus of claim 35, wherein the data source indications and data source predictions include one or more of virtual addresses and physical addresses.

37. The apparatus of claim 35, wherein the prefetch predictor includes one or more of a hardware table, cache, register file, and content addressable memory.

38. The apparatus of claim 35 further comprising a set of one or more stores to host branch handling information.

39. The apparatus of claim 38, wherein the branch handling information includes triggering instruction addresses and return addresses.

40. The apparatus of claim 35 further comprising a hardware scouting mechanism.

41. A computer program product encoded on one or more machine-readable storage media, the computer program product comprising:
a first sequence of instructions executable to, maintain a prefetch prediction encoding that indicates data sources of triggering read operations and prefetch data source prediction for triggering read operations in accordance with observed runtime occurrences of the data sources, and supply prefetch data source prediction from the prefetch prediction encoding; and
a second sequence of instructions executable to modify a code unit, with respect to read operations of the code unit that have at least one instance that triggers runahead execution of the code unit, to cause the first sequence of instructions to be executed.

42. The computer program product of claim 41, wherein to modify the code unit comprises inserting control transfer type instructions into the code unit proximate to the runahead execution triggering read operations.

43. The computer program product of claim 42, wherein the control transfer type instructions transfer control to instruction address storing instruction sequences that reference the first sequence of instructions.

44. The computer program product of claim 42, wherein the control transfer type instructions transfer control to the first sequence of instructions.

45. The computer program product of claim 41 further comprising a third sequence of instructions executable to generate instruction sequences for each of the runahead execution triggering read operations, wherein the generated instructions sequences store instruction addresses of the respective runahead execution triggering read operation and respective return addresses.

46. The computer program product of claim 41, wherein the data sources and prefetch data source predictions include one or more of virtual addresses and physical addresses.

47. The computer program product of claim 41, wherein the read operations with at least one instance that triggers runahead execution are projected as missing frequently.

48. The computer program product of claim 47, wherein the projection of frequent misses is based, at least in part, on code performance information.

49. The computer program product of claim 41, wherein the prefetch prediction encoding includes a logical structure, a physical structure, or a combination of a logical structure and a physical structure.

50. A computer program product encoded on one or more machine-readable storage media, the computer program product comprising:
a sequence of instructions that includes read instructions, and code activation instructions previously inserted into the sequence of instructions, the code activation instructions indicating a target location that corresponds to a prefetch predictor, wherein the code activation instructions are proximate to those of the read instructions projected as triggering runahead execution of the sequence of instructions and include conditional control transfer type instructions.

51. The computer program product of claim 50 further comprising neutral instructions inserted into the sequence of instructions to indicate those of the read instructions projected to miss frequently in accordance with profile information about the sequence of instructions.

52. A system comprising:
memory;
a network interface; and
a set of one or more processors, at least one of the processors including, a prefetch predictor operable to generate and supply data source prefetch predictions for runahead execution triggering read operations based on certain patterns in prior occurrences of the runahead execution triggering read operations, and a prefetcher operable to prefetch predicted data source prefetches.

53. The system of claim 52 further comprising a runahead execution mechanism.

54. The system of claim 52 further comprising a code profiler.

* * * * *